June 20, 1967  H. F. RUNGE  3,325,965
FILM LAMINATOR FOR PACKAGING MACHINES
Filed Oct. 21, 1964  3 Sheets-Sheet 1
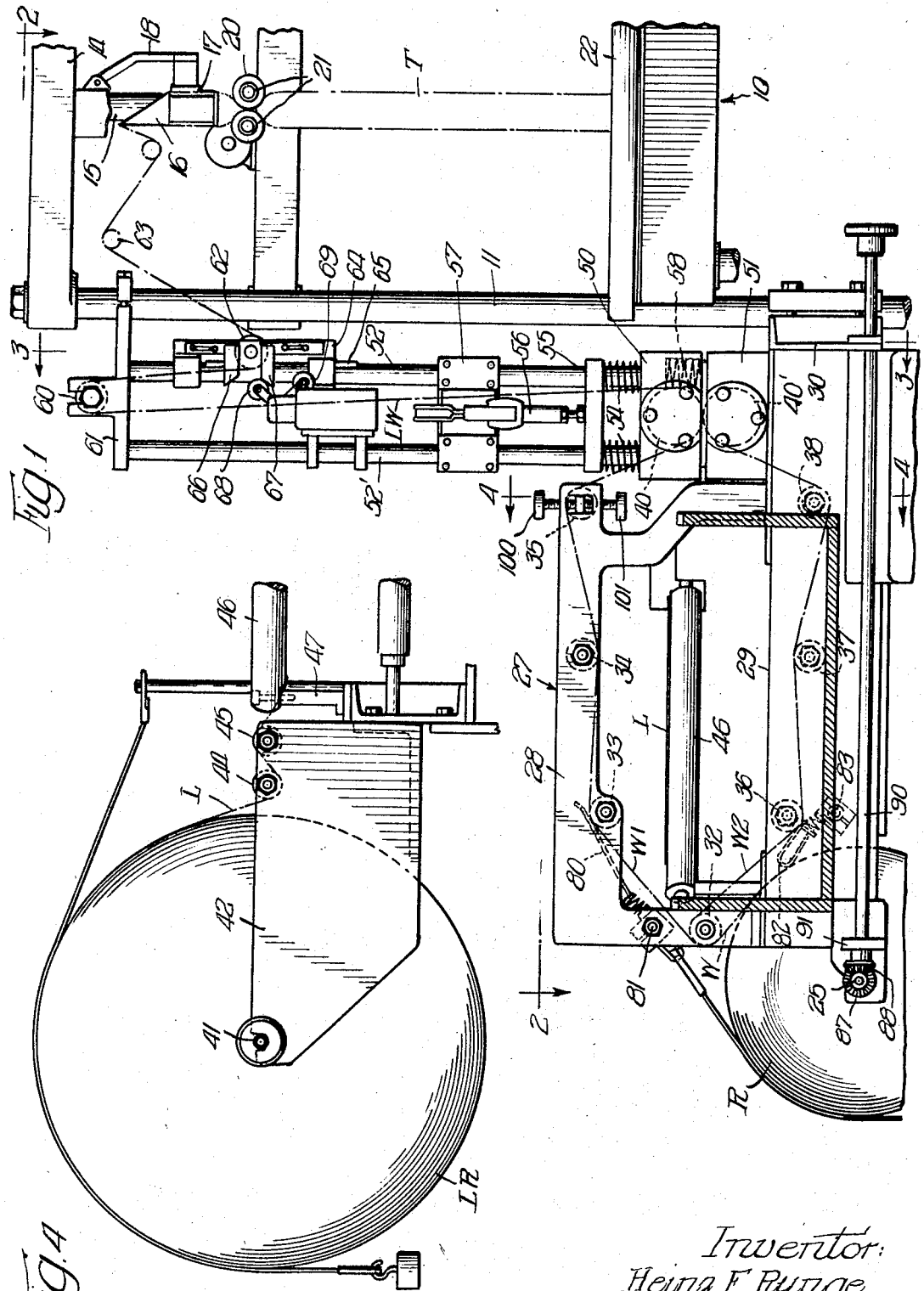
Inventor:
Heinz F. Runge, June 20, 1967 H. F. RUNGE 3,325,965
FILM LAMINATOR FOR PACKAGING MACHINES
Filed Oct. 21, 1964 3 Sheets-Sheet 2
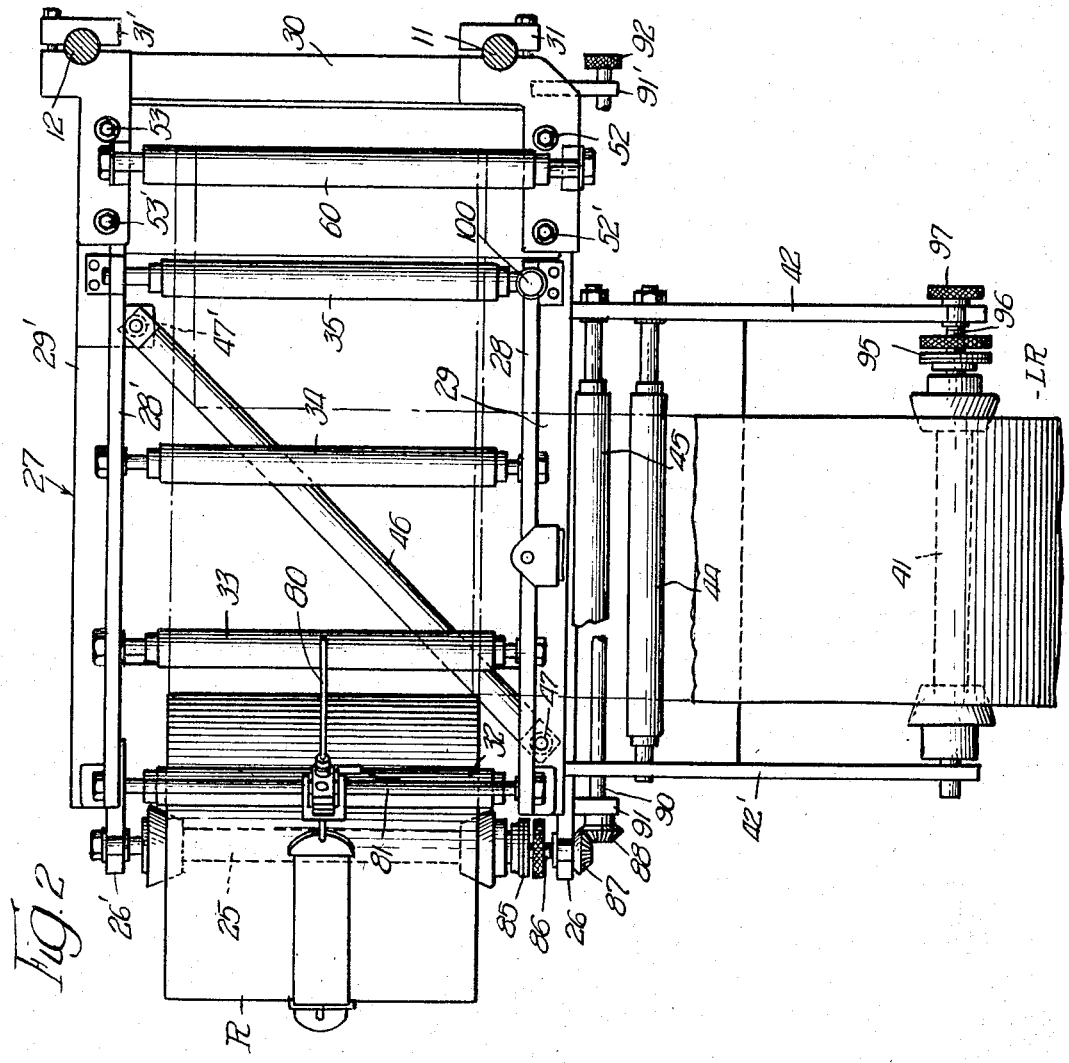
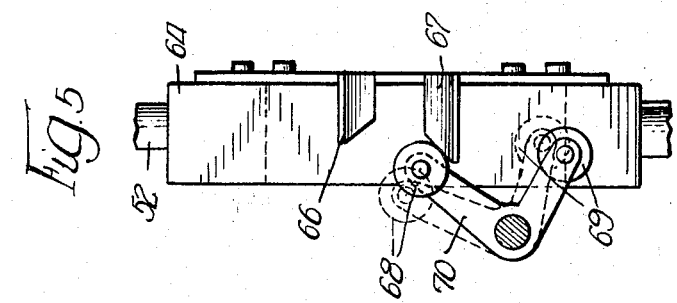
Inventor:
Heinz F. Runge,
Greist, Lockwood, Greenawalt & Dewey
Attys June 20, 1967     H. F. RUNGE     3,325,965
FILM LAMINATOR FOR PACKAGING MACHINES
Filed Oct. 21, 1964     3 Sheets-Sheet 3
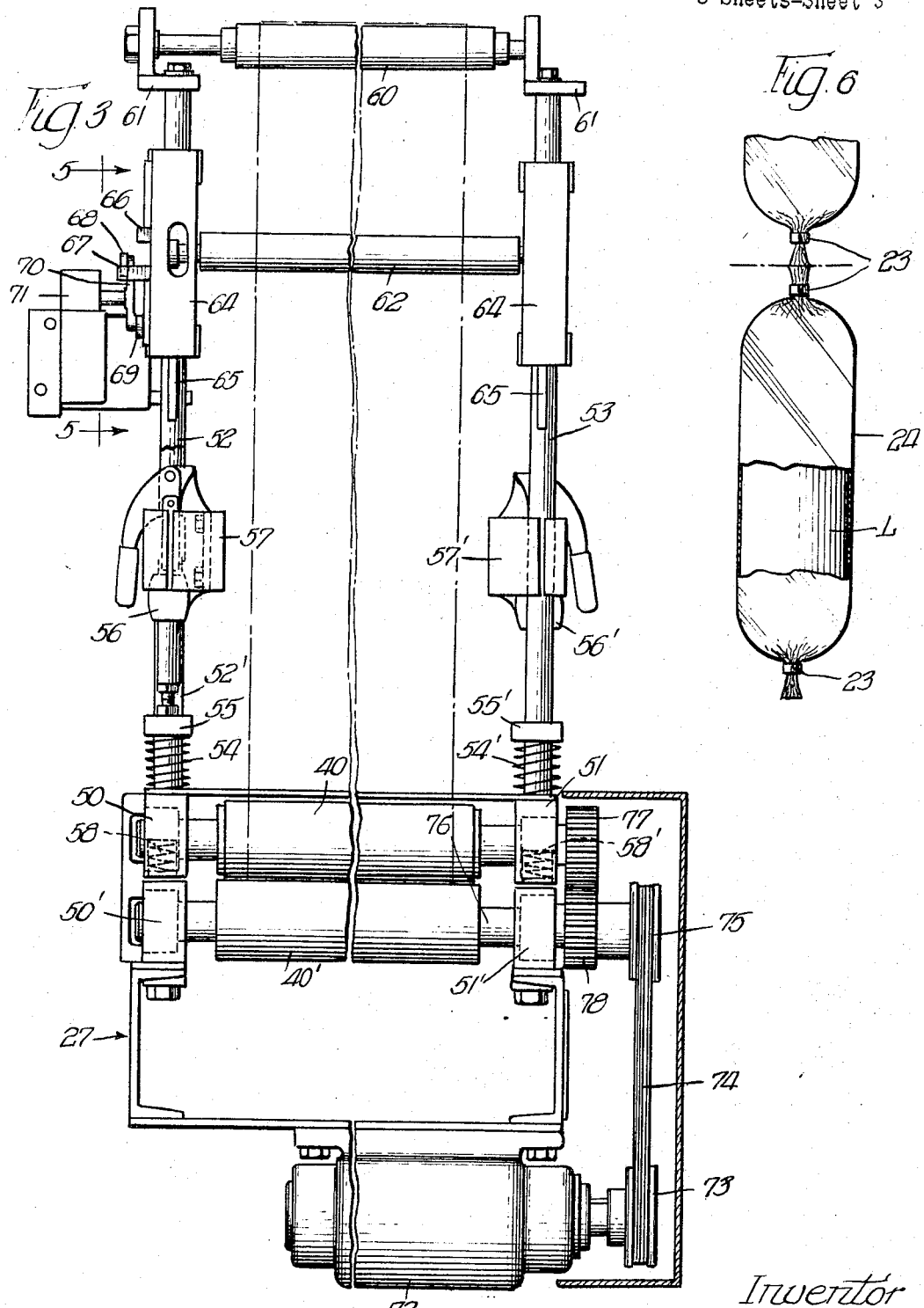
Inventor
Heinz F. Runge United States Patent Office  3,325,965
Patented June 20, 1967

3,325,965
FILM LAMINATOR FOR PACKAGING MACHINE
Heinz F. Runge, Mount Prospect, Ill., assignor, by mesne assignments, to The Kartridg Pak Co., Davenport, Iowa, a corporation of Iowa
Filed Oct. 21, 1964, Ser. No. 405,454
9 Claims. (Cl. 53—180)

This invention relates to packaging and is more particularly concerned with apparatus for supplying packaging material in the form of a laminate which includes an inner ply printed or otherwise treated so as to serve as a label.

It is a general object of the invention to provide an apparatus for supplying packaging material to a packaging machine in the form of a multi-ply web with one of the plies, which is adapted to form an inner ply in the completed package, being printed or otherwise treated so as to serve as a label which is visible through the outer ply.

It is a more specific object of the invention to provide an apparatus for supplying a composite film of package forming material to a packaging machine or the like wherein one of the plies is printed or otherwise treated so that it is adapted to serve as a label and the label forming ply is combined with one or more plies of packaging film to provide a laminate with the label forming ply adapted to constitute an inner ply in the finished package which is protected against damage by an outer ply, with provision for rendering the inner ply visible through the overlying outer ply.

It is a still more specific object of the invention to provide an apparatus for forming a laminate for use as a packaging material wherein a double ply web of packaging film is separated into its separate plies and a label forming ply is fed between the separated plies so that it is trapped therebetween and the two plies are re-laminated with the label forming ply between the same whereby when the resultant laminate is fed to the packaging machine and formed into a package the label forming ply is protected by the two adjacent plies and is visible through the outermost ply thereof in the finished package.

Another object of the invention is to provide a laminating apparatus of the type described wherein provision is made for adjusting the feed of the packaging film and the label material so as to properly align the same and also for controlling the speed of delivery of the resultant laminate according to the requirements of the wrapping machine.

These and other objects and advantages of the invention will be apparent from the consideration of the apparatus which is shown by way of illustration in the accompanying drawings wherein:

FIGURE 1 is a partial front elevation of a wrapping machine having combined therewith a laminating apparatus which embodies the principal features of the invention;

FIGURE 2 is a sectional view, taken on the line 2—2 of FIGURE 1, with portions broken away;

FIGURE 3 is a sectional view, to an enlarged scale, taken on the line 3—3 of FIGURE 1, with portions broken away;

FIGURE 4 is a partial section taken on the line 4—4 of FIGURE 1;

FIGURE 5 is a fragmentary sectional view, taken on the line 5—5 of FIGURE 3, to an enlarged scale; and FIGURE 6 is an elevational view showing a package formed with the multi-ply film material to the character adapted to be supplied by the present apparatus.

Referring to the drawings, the apparatus of the present invention is shown, for the purpose of illustration, as embodied in or attached to a package forming machine of the continuous tube forming type, it being understood that the use of the apparatus is not limited to this particular packaging machine structure which is constructed substantially in accordance with the disclosure in Jensen and Eberman Patent No. 2,831,302, to which reference may be had for details thereof not hereinafter described.

The packaging machine, indicated at 10 (FIGURE 1), is supported on an upright frame which includes four vertical posts, two of which are shown at 11 and 12 (FIGURE 2). The posts 11 and 12 extend upwardly from a supporting base (not shown) at one side of the machine to a top cross frame 14 disposed horizontally in vertically spaced relation above the top of the base. The top frame 14 supports in depending relation therefrom a hollow tube forming and filling mandrel 15 having associated therewith a tube forming collar 16 and longitudinal seal forming or seaming apparatus 17 which is supported on a pivotally mounted U-shaped support bracket 18. The forming mandrel 15 has a conduit (not shown) connecting it with the product supply line for delivering to the mandrel the product to be packaged, the product being in a fluid or semi-fluid state. A tube gripping and advancing mechanism 20 is positioned near the end of the mandrel 15 which includes spaced pairs of driven rollers 21 for engaging side portions of the filled tube and drawing it downwardly over the end of the mandrel. The rollers 21 are driven by an associated power drive mechanism (not shown). The filled tube T is advanced downwardly through a cross head 22 which is in the form of a rectangular frame extending transversely of the machine and mounted for reciprocation in a vertical path with power drive means for effecting the reciprocation. The head 22 is equipped with mechanism for constricting the filled tube at intervals and applying pairs of spaced metal clips 23 (FIGURE 6) to divide the same into individual packages 24, with the packages adapted to be separated by severing the constricted tube material in the space between the clips 23. The rate of feed of the product to the mandrel 15, the speed of the tube feeding rollers 21, the rate of movement of the head 22 may all be adjusted according to the product being packaged and the size of package desired.

In the form of the apparatus shown, the packaging or wrapping material is supplied in the form of a double wound or double ply film or web W on a roll R (FIGURES 1 and 2). Preferably, the web W is a transparent film material, for example, double wound "Saran" film which is readily available and suitable for packaging many products. The supply roll R is supported on a shaft 25 which is in turn supported on a pair of plate-like brackets 26 and 26' at the outer end of a supporting frame 27, which includes parallel side frame plates 28 and 28' upstanding from bottom channel members 29 and 29' which are connected at one end by a cross member 30, the latter having spaced clamp plates 31 and 31' for securing the supporting frame to the upright posts 11 and 12 as indicated in FIGURES 1 and 2. The web W leaves the supply roll R and passes first over roller 32 which is journaled in the spaced side frame members 28 and 28'. The web W is separated as it leaves roll 32 into its two plies W1 and W2. The uppermost ply W1 passes over the roll 33, beneath the roll 34 and over the roll 35, all of these rolls constituting stress relieving rolls which are mounted on suitable shafts extending between the top portions of the side frame plates 28 and 28'. The lowermost web W2 passes beneath the roll 36, above the roll 37 and beneath the roll 38, these rolls being supported on spaced cross shafts extending between the frame side plates 28 and 28' a substantial distance below the top rolls 33, 34 and 35 and generally in vertical alignment therewith. The two webs W1 and W2 are brought back together and re-laminated by a pair of feeding and combining rolls 40 and 40' mounted at the inner end of the frame 27.

A label forming web L is supplied from a roll LR on a shaft 41 which is supported on a pair of spaced, parallel, vertically disposed plates 42 and 42' which constitute the main members of a side frame extending from one side of the supporting frame 27. The label web L passes from the roll LR under the roll 44 and over the roll 45 to a turning bar 46. The rolls 44 and 45 are mounted on suitable shafts extending between the plates 42 and 42' adjacent the side plate member 28 of the frame 27. The turning bar 46 is supported on upstanding posts 47 and 47' in the space between the uppermost line of rolls 33, 34 and 35 at the upper side of the frame 27 and the lowermost line of rolls 36, 37 and 38 at the lower side thereof. The turning bar 46 is disposed at a 45° angle relative to the path of the two plies W1 and W2, the ply W1 traveling a generally horizontal path defined by rolls 33, 34 and 35 which is vertically aligned and spaced above the path of the ply W2 which is defined by the rolls 36, 37 and 38 so that when the label forming ply or web L is advanced around the bar 46 it is aligned with the two plies or webs W1 and W2 and the three plies or webs are brought together between the nip of the combining rolls 40 and 40'.

The feeding and laminating or combining rolls 40 and 40' are formed of materials which will grip the webs in a suitable manner and these rolls are supported in pairs of bearing blocks 50, 50' and 51, 51'. The bearing blocks 50 and 50' are disposed at the bottom of upright frame forming rods 52, 52' and 53, 53' which extend in paired relation at the opposite sides and at the inner end of the frame 27. The bearing blocks 50 and 50' are mounted in fixed position while the bearing blocks 51 and 51' are slidably supported on the uprights 52, 52' and 53, 53' respectively. The bearing blocks 51 and 51' are pressed downwardly to apply pressure between the rolls 40 and 40' by pairs of springs 54, 54' beneath cross plates 55 and 55' which have associated therewith toggle action type clamps 56 and 56' mounted on brackets 57 and 57', the latter being secured on the vertical members 52, 52' and 53, 53' and the clamps serving to move the cross plates 55 and 55' into pressure applying position and to releasably hold the same in such position. Each of the bearing blocks 51 and 51' is provided with a soft spring 58, 58' to facilitate threading of the composite web between the two rolls 40 and 40'. The composite or relaminated web LW is advanced upwardly by the rolls 40 and 40' to a guide roll 60 which is rotatably mounted in forming frame members 61 at the top of the uprights 52, 52' and 53, 53'. The web LW advances around the roll 60 and beneath a dancer roll 62 and then to the rolls 63 which guide the web to the tube forming collar 16. The dancer roll 62 is supported at each end by a carriage 64 and the carriages are mounted for vertical sliding movement on the frame posts 52' and 53', each being held against rotation thereon by a key 65. One carriage 64 carries a pair of switch actuating arms 66 and 67 (FIGURES 3 and 5) which are vertically spaced thereon and the upper one of which is set out from the carriage so as to engage switch actuating rollers 68 and 69, respectively, on a switch actuationg bell crank 70 on the switch 71. The switch 71 controls the speed of the feed motor 72 (FIGURE 3) for driving the feeding and combining rolls 40 and 40'. Motor 72 is mounted in the base of the frame 27 and carries drive pulley 73 which is connected by double drive belts 74 with a pulley 75 on the extended end of the shaft 76 of the lowermost roll 40. The two rolls 40 and 40' are connected by driving gears 77 and 78.

Film or web sensing devices are associated with the stress relieving rolls 33 and 36 so as to interrupt the operation of the packaging machine 10 if either web W1 or W2 is broken or missing. At the upper roll 33 a metal contact arm or strap 80 is mounted on the frame cross bar 81 extending between the frame side plates 28 and 28'. In operative position the free end of the arm 80 is spring urged against the roll 33, the film web W1 normally acting as an insulator but permitting contact of the arm 80 with the metal roll 33 when the web is broken. The arm 80 is electrically connected into the drive motor circuit so that it acts as a switch to cut off the drive motor and stop the machine 10 when the arm 80 contacts the roll 33. A similar metal contact arm 82 is mounted in like manner on a frame cross bar 83 adjacent the roll 36 which is spring urged against the metal stress relieving roll 36 and serves as a switch to cut off current to the main drive motor when the web W2 breaks or is missing.

The shaft 25 for supporting the web roll R is provided with a device at 85 (FIGURE 2) for adjusting the position thereof in the axial direction which is operated by rotation of the screw 86 at the end of the shaft. A bevel gear 87 on the screw 86 is in toothed engagement with a bevel gear 88 on the end of an adjusting shaft 90 which is journaled in bearing brackets 91 and 91' on the support frame 27 and has an operating knob 92 for manual rotation by the machine operator. In like manner, supporting shaft 41 for the label roll LR is provided with a device 95 (FIGURE 2) for adjusting the shaft in the axial direction which is operated by turning a screw 96, the latter having an operating knob 97. The upper stress relieving roll 35 has one end of its supporting shaft 98 mounted between a pair of oppositely disposed, vertically aligned position adjusting screws 100 and 101 so that roll 35 may be tilted to adjust the tracking of the web W1. With these three controls the operator is able to adjust the paths traveled by the webs or plies W1, W2 and L to bring the webs into the desired alignment as they advance between the laminating rolls 40 and 40'.

The operation of the apparatus will be obvious from the foregoing description thereof. The operator is able to keep the webs in proper alignment by the adjustments described and the feed of the re-laminated material is automatically controlled according to the demands of the package forming machine 10.

In the event it is desired to operate the packaging machine 10 with a single web of packaging material so that the laminating operation is not required, the latter can be bypassed by proper threading of the web W to bring the web to top guide roll 60 in the same condition in which it leaves the supply roll R. The web may be threaded over the roll 32 and advanced directly to the feeding rolls 40 and 40' so as to positively feed the same with the movement of the dancer roll 62 controlling the feed.

While specific materials and particular details of construction are referred to in describing the illustrated form of the apparatus, it will understood that other materials and equivalent structural details may be restored to within the spirit of the invention.

I claim:

1. Apparatus for supplying package forming material to a packaging machine in which a continuous web of the packaging material is drawn over a hollow forming mandrel on which the web is shaped into a continuous tube and filled with a product and the tube is subsequently constricted at intervals, sealed in the constricted areas and divided into individual packages, said supply apparatus comprising a frame mounted on the packaging machine and having means for supporting a supply roll of double ply film material, two sets of rolls spaced on the frame for supporting the two plies of the film material in separated relation, means for supporting a roll of label forming material at one side of the frame, a turning bar mounted between the ply supporting rolls over which the label forming material is advanced to position the same between the two plies of the film material, a pair of combining rolls positioned in advance of the ply supporting rolls for receiving the plies of film material with the label material interposed between the same and for advancing the resulting laminate to the forming mandrel, power means for driving the combining rolls, and means for controlling the operation of the power drive means so as to advance the laminate as required to supply the packaging machine.

2. Apparatus for supplying package forming material to a packaging machine in which a continuous web of the material is drawn over a hollow forming mandrel where the web is shaped into a continuous tube and filled with a product, the tube being subsequently constricted at intervals, sealed in the constricted areas and divided into individual packages, said supply apparatus comprising a frame adapted to be mounted at one side of the packaging machine and having means for supporting a supply roll of double ply package forming material, a plurality of rolls spaced on the frame for supporting the two plies of the packaging material in separated paths which are in generally parallel relation, means for supporting a roll of label forming material at one side of the frame, a turning bar mounted between the ply supporting rolls over which the label forming material is advanced, said turning bar being disposed at an angle relative to the longitudinal path of the plies of packaging material to position the label forming material in alignment between the two plies of the packaging material, a pair of combining rolls positioned in advance of the ply supporting rolls for receiving the plies of packaging material with the label material trapped between the same and for advancing the resulting laminate to the packaging machine, and power means for driving the combining rolls so as to advance the laminate to the packaging machine.

3. Apparatus for supplying package forming material to a packaging machine in which a continuous web of the material is fed to a hollow forming mandrel on which the web is shaped into a continuous tube and filled with a product and the tube is subsequently constricted at intervals, sealed in the constricted areas and divided into individual packages, said supply apparatus comprising a frame mounted on the machine and having means for supporting a supply roll of double ply packaging material, two sets of rolls vertically spaced on the frame with the rolls of each set spaced horizontally for supporting the two plies of the packaging material in vertically separated paths, means for supporting a roll of label forming material at one side of the frame, a turning bar between the ply supporting rolls over which the label forming material is advanced to bring the same into a path between the two plies of the packaging material, a pair of combining rolls positioned in advance of the ply supporting rolls for receiving the plies of packaging material with the ply of label material trapped between the same and for advancing the resulting laminate to the forming mandrel, power means for driving the combining rolls, and means for controlling the operation of the power means so as to advance the laminate to the packaging machine.

4. Apparatus for supplying a package forming laminate to a packaging machine in which a continuous web of packaging film material is fed to a hollow forming mandrel on which the web is shaped into a continuous tube and filled with a product, said supply apparatus comprising a supporting frame adapted to be mounted on the machine and having a supply roll of double ply packaging film, two sets of web supporting rolls vertically spaced on the supporting frame for receiving the two plies of the packaging film in separated relation, means for supporting a supply a roll of label forming material mounted at one side of the frame, a turning bar between the ply supporting rolls over which the label forming material is advanced to change its path and position the same between the two plies of the packaging film, a pair of combining rolls positioned adjacent the ply supporting rolls for receiving therebetween the plies of packaging film with the label material interposed between the same, means operative on the combining rolls for applying resilient pressure to the film and label material, and power means for driving the combining rolls so as to advance the resulting laminate to the forming mandrel.

5. Apparatus for supplying packaging material to a packaging machine in which a continuous web of the packaging material is drawn over a hollow forming mandrel to form a continuous tube and filled with a product, thereafter the filled tube is constricted at intervals and sealed in the constricted areas so as to divide the same into individual packages, said apparatus comprising a frame mounted on the packaging machine and having means for supplying two webs of the packaging material, two sets of rolls spaced on the frame for supporting the two webs of the packaging material for travel in separated paths, means for supplying a web of label forming material at one side of the frame, a turning bar mounted between the two sets of supporting rolls over which the label forming material is advance to position the same between the two webs of the packaging material, a pair of combining rolls positioned in advance of the two sets of supporting rolls for receiving the packaging material with the label material interposed between the two webs thereof and for advancing the resulting laminate to the forming mandrel, power means for driving the combining rolls, and means for controlling the operation of the power drive means so as to advance the laminate as required to supply the packaging machine.

6. Apparatus for supplying a package forming laminate to a packaging machine in which a continuous web of packaging film is fed to a hollow forming and filling mandrel on which the web is formed into a continuous tube and filled with a product, said supply apparatus comprising a supporting frame adapted to be mounted on the machine and having means for supporting two webs of packaging film, two sets of web supporting rolls vertically spaced on the supporting frame for supporting the two webs of the packaging film in generally parallel, vertically separated paths, means for supporting a supply web of label forming material at one side of the frame, a web turning means between the supporting rolls to which the label forming material is advance to change its path and position the same between the two web of the packaging film, a pair of combining rolls positioned in advance of the web supporting rolls for receiving between them the two webs of packaging film with the label material trapped between the same, means for pressing the combining rolls together and power means for driving the combining rolls so as to advance the resulting laminate to the forming and filling mandrel.

7. Apparatus for supplying package forming material to a packaging machine having means for guiding a continuous web of the material around a hollow forming mandrel on which the web is shaped into a continuous tube, filled with a product and divided into individual packages, said supply apparatus comprising a supporting frame adapted to be mounted on the packaging machine and haying means for supporting a supply of double ply packaging material, a guide roll at which the two plies are separated for travel in two vertically separated paths, two sets of rolls vertically spaced on the frame with the rolls of each set spaced horizontally for supporting the two plies of the packaging material in said vertically separated paths, means for supplying a web of label forming material at one side of the frame, a turning device between the ply supporting rolls to which the label forming material is advanced so as to guide the same into a path between the two plies of the packaging material, a pair of combining rolls positioned in advance of the ply supporting rolls for receiving the plies of packaging material with the ply of label material trapped between the same and for advancing the resulting laminate to the forming mandrel, power means for driving the combining rolls, and means for controlling the operation of the power means so as to advance the laminate as required to supply the packaging machine.

8. Apparatus for supplying package forming material to a packaging machine in which a continuous web of the packaging material is drawn over a hollow forming mandrel where the web is shaped into a continuous tube and filled with a product, the tube being subsequently constricted and sealed at intervals to divide the filled tube into individual packages, said apparatus comprising a frame adapted to be mounted at one side of the packaging machine and having means for supporting a roll of package forming material which is in double ply relation, a plurality of rollers spaced on the frame for supporting the two plies of the packaging material in vertically spaced, separate paths which are in generally parallel relation, means for guiding the two plies of packaging material into said separate paths, means for supporting a web of label forming material at one side of the frame, a turning member mounted between the ply supporting rolls over which the label forming material is advanced, said turning member being disposed at an angle relative to the longitudinal path of the plies of packaging material to position the label forming material in alignment between the two plies of the packaging material, a pair of combining rolls positioned adjacent the discharge ends of the ply supporting rolls and arranged to receive between them and press together the plies of packaging material with the label material trapped between the same and power means driving the combining rolls for advancing the resulting laminate to the packaging machine.

9. Apparatus for supplying packaging material to a packaging machine in which a continuous web of the packaging material is drawn over a hollow forming mandrel to form a continuous tube and filled with a product, thereafter the filled tube is constricted at intervals and sealed in the constricted areas so as to divide the same into individual packages, said apparatus comprising a frame mounted on the packaging machine and having means to supply two webs of the packaging material, two sets of rolls spaced on the frame for supporting the two webs of the packaging material for travel in generally parallel, separated paths, means for supplying a web of label forming material at one side of the frame, means mounted between the two sets of supporting rolls for guiding the label forming material so as to position the web thereof in alignment between the two webs of the packaging material, a pair of combining rolls positioned in advance of the two sets of supporting rolls for receiving the packaging material with the label material trapped in aligned relation between the two webs of packaging material and for advancing the resulting laminate to the forming mandrel, power means for driving the combining rolls, and means for controlling the operation of the power drive means so as to advance the laminate in accordance with the demands of the packaging machines.

References Cited

UNITED STATES PATENTS

| 1,967,635 | 7/1934 | Tornberg. | |
| 2,226,442 | 12/1940 | Rumsey | 53—28 X |
| 2,257,823 | 10/1941 | Stokes | 53—27 |
| 2,462,254 | 2/1949 | Campbell | 53—182 X |

FOREIGN PATENTS 610,954   10/1960   Italy.

TRAVIS S. McGEHEE, *Primary Examiner.*